R. C. MORGANSTERN & E. A. SHEPHARD.
CAR FENDER.
APPLICATION FILED APR. 21, 1908.

928,615.

Patented July 20, 1909.

Witnesses:
J. Raymond Hoover
M. L. Pugh

Inventors:
Robt. C. Morganstern and
Edward A. Shephard,
by Chas. J. Williamson, Atty.

UNITED STATES PATENT OFFICE.

ROBERT C. MORGANSTERN AND EDWARD A. SHEPHARD, OF PORTLAND, OREGON.

CAR-FENDER.

No. 928,615.     Specification of Letters Patent.     Patented July 20, 1909.

Application filed April 21, 1908. Serial No. 428,334.

*To all whom it may concern:*

Be it known that we, ROBERT C. MORGANSTERN and EDWARD A. SHEPHARD, of Portland, in the county of Multnomah and in the State of Oregon, have invented a certain new and useful Improvement in Car-Fenders, and do hereby declare that the following is a full, clear, and exact description thereof, reference being had to the accompanying drawings, in which—

Figure 1:
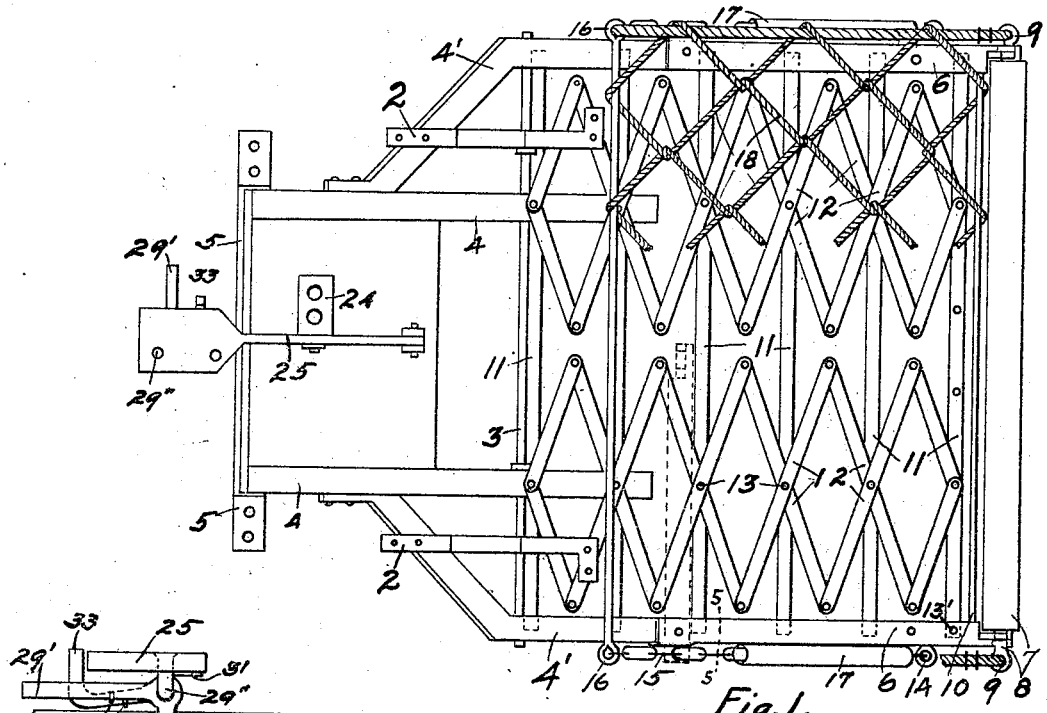
Figure 3:
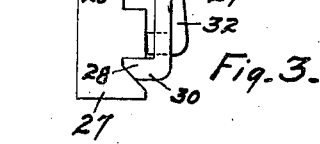
Figure 4:
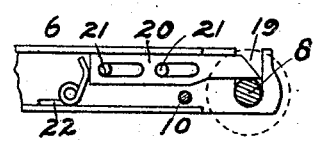
Figure 2:
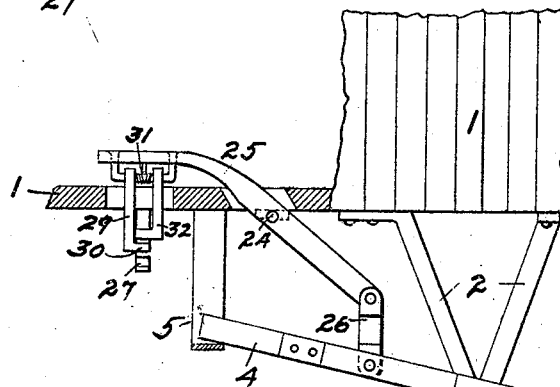
Figure 5:
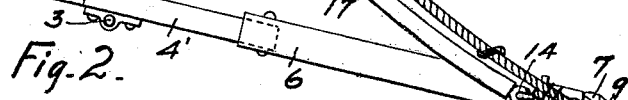

Figure 1 is a top plan view of a car fender constructed in accordance with our invention shown separate from a car, and portions being removed to better illustrate the device; Fig. 2 a side elevation showing a portion of the car, some parts being in section; Fig. 3 a detail view in side elevation of the latch and trip mechanism; Fig. 4 a detail view, parts being in elevation and parts in section, showing the means for detachably mounting the front roller; and Fig. 5 a detail view in cross section on the line 5—5 of Fig. 1.

The object of our invention is to provide a fender for street cars or other vehicles which will have the qualities of preventing persons passing beneath the car, and at the same time avoiding shock or injury to them from contact with the fender; of easily and promptly being placed into and out of position; and of collapsibility or foldability into a compact space to enable the car to be coupled to another car; and for such other purposes as may render compact folding desirable.

In producing our invention we have considered it desirable that normally the fender shall be supported sufficiently above the surface of the ground as to be a hindrance in no degree of the proper operation of the car, but capable of having its forward end dropped into contact with or near the surface of the ground so as to make it impossible for a body to pass beneath it, and in the carrying out of this idea, we bolt or otherwise attach to the bottom or floor of the car 1, at the front thereof, brackets or hangers 2 which at their lower ends support a rod or shaft 3 that extends crosswise of the car to pivotally support our fender frame intermediate its front and rear ends so that by raising the rear end of the frame, the front end of the fender will be lowered, and by the lowering of the rear end of the frame, the front end of the fender will be lifted.

The frame at the rear comprises two parallel forwardly and rearwardly extending bars 4 which in themselves, or by reason of being weighted, are sufficiently heavy to overbalance the counterweight forward of the pivot 3 so as to lift and maintain the front end of the fender at the desired distance above the surface over which the car is passing, and the downward movement of said bars 4 is limited by their engaging a loop or bracket 5 bolted to the under side of the car floor. Attached to the respective frame bars 4 are two other bars 4', having forwardly and outwardly inclined portions, from which extend forwardly extending parts that lie parallel to each other, and said bars 4' are made of channel iron, or are otherwise formed so as to provide on their inner sides longitudinally extending grooves or recesses. Pivotally connected to the forward extremity of each of said bars 4', is a straight bar 6 also of channel iron, or otherwise formed to provide on its inner side a longitudinally extending groove or channel, the pivotal connection of said bar 6 being for the purpose of enabling it to be swung from a forwardly extending position to a crosswise extending position as indicated in dotted lines in Fig. 1, when it is desired to collapse or reduce the bulk of the fender. When the two bars 6 are in their extended position, they support at their front ends a cross shaft or bar 8 upon which is journaled or mounted a roller 7 of rubber or other cushion-forming material, and to enable said roller and its shaft 8 to be readily applied to and removed from the bar 6, each of the bars has in its upper side near its front end a vertically extending notch 19 to receive the shaft 8, and the latter is retained in place in the notch by means of a sliding latch bar 20 which lies over the shaft 8 when it is in position in the notch, and in which position the latch bar 20 is yieldingly held by a spring 22, the latch being guided in its longitudinal movements by means of pins or studs 21 in the bar 6 that engage slots in the latch bar. The portion of the latch bar which overlies the shaft 8 has its upper side beveled or inclined so that by the mere dropping of the shaft 8 downward into the slots 19, the latch bar will be automatically moved out of the path of the shaft 8 as it descends, and as soon as the shaft 8 passes beneath the latch bar it will be projected by the spring 22 over the shaft 8. At each end the shaft 8 is formed into an eye 9, and to the eye is attached one end of a rope 18 whose other end is secured to an eye in a rod 16 secured to the front end of the car at a much higher level so that at each side of the car there is a rearwardly and upwardly extending rope, and a netting formed of interlacing ropes 18 is stretched across from a rope 18 at one side of the fender to the rope 18 at the opposite side, and from the rod 16 to a rod 10 that is detachably connected at its ends to the frame bars 6 just in rear of the roller 7, the rope netting, of course, being provided to receive a person falling on to the fender. Also at each side of the fender to aid in supporting the same, a chain 15 attached at one end to the rod 16, extends downward and forward and is attached at its front lower end to an eye 14 on the bar 6, and preferably for a portion of its length from its forward end upward and rearward, the chain has a covering 17 of rubber or other cushion-forming material.

Extending from side to side of the fender is a series of horizontal parallel rods or bars 11 whose ends enter and are supported by the grooves or channels in the bars 4' and 6 when the latter are in their opened or extended position, and thus the frame formed by these bars is braced or stiffened, but all the bars 11, except the rearmost one, are slidably supported by the bars 4' and 6, so that they may be moved together in a close or compact condition when the fender is to be collapsed or opened out to proper position for serving as braces or supports, and the series of bars for their convenient manipulation are connected together on the pantograph principle, or by lazy-tongs 12, there being preferably two sets of lazy-tongs. When the bars are opened or extended, they are secured in this position by fastening the forward bar 11 by means of a removable pin 13' passing through alining holes in said bar and in the bar 6, and the same pins are utilized with the same bar to hold the series of bars in their collapsed state.

To lower the front end of the fender when it is desired to use the fender, I employ a foot lever or treadle 25, which is pivoted to a bearing 24 on the floor of the car, and which at its forward end is connected by a link 26 to the rear end of the fender frame, and has its foot-engaging portion conveniently situated, and I prefer to lock the fender in both its positions, employing a latch 32 which engages a notch 28' in a plate 27 secured to and projecting below the floor of the car for maintaining the fender with its front end raised, which latch 32 is pivotally connected to the treadle 25 by means of a bearing 29'' secured to the under side of the treadle, and the latch 32 having a finger 33 alongside of and projecting above the top surface of the foot-engaging portion of the treadle 25 when the latch 32 interlocks with the notch 28', so that when the foot is moved into contact with the treadle 25 it will first engage the finger 33, and depressing it will rock the latch 32 to disengage it from its notch 28', thereby leaving the treadle 25 free to be operated to lift the rear end of the fender frame and depress the front end thereof.

To latch the fender with its front end in depressed position, I provide latch 29 also pivoted to the bearing 29'' and having a finger or tooth 30 to engage a notch 28 in the plate 27 and provided with an extension or arm 29' adapted to be engaged by the foot of the operator to disengage the finger 30 from its notch 28 when it is desired to release the fender so that under the weight of the rear portion of the frame it may automatically move to lift its front end to the desired position above the surface over which the car is moving. A spring 31 is so applied to both the latches 29 and 32 as to tend normally to cause them to engage their respective locking notches. It will be seen that the operation of the fender to move it into and out of position may be done instantaneously, and solely by the foot of the operator.

Having thus described our invention, what we claim is—

1. A car fender having a supporting frame, comprising longitudinally extending bars that are horizontally movable toward each other, and a transversely extending bar detachably connected to said longitudinally extending bars and interposed between them.

2. A car fender having a supporting frame, comprising horizontally swinging bars movable toward each other, and a roller detachably connected with said bars and extending between them.

3. A car fender having a frame comprising foldable or collapsible side bars having longitudinally extending grooves in their inner sides and a series of foldable or expansible bars extending from side bar to side bar and slidable in the grooves of said side bars.

4. In a car fender, the combination of a rock shaft, longitudinally extending bars pivoted to said rock shaft, other longitudinally extending bars connected to the first mentioned longitudinally extending bars and pivoted to said shaft, and extending forward of the same, and having their forward portions jointed and movable horizontally toward and from each other, and transversely extending bars lying between said jointed bars.

5. In a car fender, the combination of a rock shaft, longitudinally extending bars pivoted to said rock shaft, other longitudinally extending bars connected to the first mentioned longitudinally extending bars and pivoted to said shaft, and extending forward of the same, and having their forward portions jointed and movable horizontally toward and from each other, a roller detachably connected to the forward ends of said jointed bars, and a latch at each end of the roller.

6. In a car fender, the combination of a frame, means for pivotally supporting the same from a car, a body receiving fabric secured at one end to said frame and at the other end adapted to be secured to the car, an operating lever for rocking the frame to lower the front end of the fender, and a double latch mechanism for the lever consisting of a pair of levers having foot engaging portions contiguous to the operating lever.

7. In a car fender, the combination of a frame, means for pivotally supporting the same from a car, an operating lever for rocking the frame, and a pair of latch levers to respectively lock the operating lever against movement in either direction, having foot engaging portions contiguous to the operating lever.

In testimony that we claim the foregoing we have hereunto set our hands.

ROBERT C. MORGANSTERN.
EDWARD A. SHEPHARD.

Witnesses:
  TRUMAN J. GLOVER,
  LESTER L. CURL.